(12) United States Patent
Cho et al.

(10) Patent No.: US 12,462,585 B2
(45) Date of Patent: Nov. 4, 2025

(54) METHOD OF AUTOMATICALLY MANAGING EMERGENCY IN MOBILITY DEVICE AND SYSTEM FOR THE SAME

(71) Applicant: HYUNDAI MOBIS CO., LTD., Seoul (KR)

(72) Inventors: Sung Sik Cho, Yongin-si (KR); Yeong Hun Park, Seoul (KR); Yu Jin Jung, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 492 days.

(21) Appl. No.: 17/867,049

(22) Filed: Jul. 18, 2022

(65) Prior Publication Data

US 2023/0186649 A1  Jun. 15, 2023

(30) Foreign Application Priority Data

Dec. 9, 2021 (KR) .......................... 10-2021-0175579

(51) Int. Cl.
| | |
|---|---|
| *G06V 20/59* | (2022.01) |
| *G06V 10/82* | (2022.01) |
| *G06V 40/20* | (2022.01) |
| *G08B 25/10* | (2006.01) |
| *G10L 25/63* | (2013.01) |

(52) U.S. Cl.
CPC .............. *G06V 20/59* (2022.01); *G06V 10/82* (2022.01); *G06V 40/20* (2022.01); *G08B 25/10* (2013.01); *G10L 25/63* (2013.01)

(58) Field of Classification Search
CPC ........ G06V 20/59; G06V 10/82; G06V 40/20; G08B 25/10; G10L 25/63
See application file for complete search history.

(56) References Cited

U.S. PATENT DOCUMENTS

| | | | |
|---|---|---|---|
| 2019/0332902 A1* | 10/2019 | Gallagher | G06V 10/811 |
| 2020/0184738 A1* | 6/2020 | Ngo | H04W 4/90 |
| 2021/0397858 A1* | 12/2021 | Buerkle | B60W 60/0016 |
| 2021/0402942 A1* | 12/2021 | Torabi | G06N 3/02 |

FOREIGN PATENT DOCUMENTS

CN         113239871 A  *  8/2021  ......... G06K 9/00335

* cited by examiner

*Primary Examiner* — S J Park
*Assistant Examiner* — Caroline E. Depalma
(74) *Attorney, Agent, or Firm* — Novo TechIP International PLLC

(57) ABSTRACT

The present disclosure relates to a method of automatically managing an emergency in a mobility device and system for the same. The method includes distinguishing passengers through an image obtained by an image sensor and determining a violent situation based on per-passenger joint position tracking, determining emotional states of one or more passengers through voice obtained by a sound sensor, based on determining the emergency requiring an emergency measure based on the determination on the violent situation and the determination on the emotional states, storing the image of the image sensor and the voice of the sound sensor, and transmitting a signal for the emergency measure to an emergency measure server.

20 Claims, 7 Drawing Sheets

METHOD OF AUTOMATICALLY MANAGING EMERGENCY IN MOBILITY DEVICE AND SYSTEM FOR THE SAME

CROSS-REFERENCE TO RELATED APPLICATIONS

Pursuant to 35 U.S.C. § 119(a), this application claims the benefit of priority to Korean Application No. 10-2021-0175579, filed on Dec. 9, 2021, the disclosure of which is incorporated herein by reference in its entirety.

BACKGROUND

1. Technical Field

The present disclosure relates to a method of automatically managing an emergency in a mobility device and system for the same, and more particularly, to a method of accurately determining an emergency in a mobility device based on video and audio obtained based on multiple sensors and automatically performing countermeasures and system for the same.

2. Discussion of Related Art

In many cases, emergencies occur, such as assaulting a bus driver by a passenger in a vehicle (e.g., a bus) with a large number of passengers on board. In order to reduce this risk, institutional measures such as strengthening punishment regulations for dangerous actors are being taken, but a technical approach is also needed to solve this problem.

Currently, the technology does not automatically determine and respond to a violent situation, but only the technology that can use the existing black box to film an assailant for a defense in a violent situation is provided.

This is only a follow-up measure in a situation where services such as car sharing, car hailing and the like have recently been expanded, and a technical means capable of automatically determining an emergency in advance and taking emergency measures is required.

SUMMARY

Accordingly, embodiments of the present disclosure are directed to a method of automatically managing an emergency in a mobility device and system for the same that substantially obviate one or more problems due to limitations and disadvantages of the related art.

One object of the present disclosure is to provide a method of automatically determining a violent situation by analyzing video and audio signals and the like and performing services such as automatic report, video storage, alarm sound generation, and the like to ensure safety of a passenger Particularly, as various embodiments of the present disclosure, the above-described functions are implemented using deep learning engines, and input/output relationships thereof, deep learning preprocessing, determination logic and the like are specifically proposed.

Technical tasks obtainable from the present disclosure are non-limited by the above-mentioned technical tasks. Also, other unmentioned technical tasks can be clearly understood from the following description by those having ordinary skill in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

To achieve these objects and other advantages, in one technical aspect of the present disclosure, provided is a method of automatically managing an emergency in a multi-sensor based mobility device, the method including distinguishing passengers through an image obtained by an image sensor and determining a violent situation based on per-passenger joint position tracking, determining emotional states of one or more passengers through voice obtained by a microphone sensor, based on determining the emergency requiring an emergency measure based on the determination on the violent situation and the determination on the emotional states, storing the image of the image sensor and the voice of the microphone sensor, and transmitting a signal for the emergency measure to an emergency measure server.

The image obtained by the image sensor may determine a presence or non-presence of a violent situation through a first deep learning engine, the voice obtained by the microphone sensor may determine the emotional state of the passenger through a second deep learning engine, and a first output of the first deep learning engine and a second output of the second deep learning engine may be inputted to a third engine for an emergency determination.

Based on a Convolutional Neural Network (CNN), the first deep learning engine may output an index indicating the presence or non-presence of the violent situation as the first output through a pre-processing process for adjusting a size of a per-passenger joint part image into a prescribed reference The first deep learning engine may output the first output by integrating the per-passenger joint part image and a per-passenger whole image.

Based on a Recurrent Neural Network (RNN), the second deep learning engine may output an index indicating the emotional state of the inputted voice as the second output.

The third engine may include a deep learning engine configured to output a third output indicating a presence or non-presence of the emergency requiring the emergency measure by giving a weight to each of the first output and the second output and adjust the weight according to feedback information from the emergency measure server.

On the other hand, the third engine may include a probability-based model (e.g., Bayesian Network, Hidden Markov Model (HMM), Conditional Random Fields (CRFs), etc.) making a determination based on a probability by receiving the first output and the second output as inputs.

The emergency measure server may include at least one of a police server, a fire station server, or a device server of a registered guardian.

The signal for the emergency measure may include identification information of the mobility device and GPS information of the mobility device.

The determination on the emergency requiring the emergency measure may be made by additionally considering abnormal vibration information detected by a vibration sensor.

In another technical aspect of the present disclosure, provided is a system for automatically managing an emergency in a multi-sensor based mobility device, the system including a multi-sensor module including an image sensor and a microphone sensor installed in a mobility device, a first deep learning engine configured to output a first output indicating a presence or non-presence of a violent situation based on passenger distinguishment and per-passenger joint position tracking by receiving an input of an image obtained by the image sensor, a second deep learning engine configured to output a second output indicating emotional states of one or more passengers by receiving an input of voice obtained by the microphone sensor, a third engine outputting a third output indicating an emergency determination result by receiving the first output of the first deep learning engine and the second output of the second deep learning engine as inputs, and a communication unit transmitting the third output as a signal for an emergency measure to an emergency measure server based on the third output related to the emergency requiring the emergency measure.

The system may further include a processor controlling the image of the image sensor and the voice of the microphone sensor to be stored based on the third output related to the emergency requiring the emergency measure.

In addition, based on the third output related to the emergency requiring the emergency measure, the processor may additionally store corresponding time information, location information of the mobility device, and information indicating whether the mobility device is currently parked or stopped.

Based on the CNN, the first deep learning engine may output an index indicating the presence or non-presence of the violent situation as the first output through a pre-processing process for adjusting a size of a per-passenger joint part image into a prescribed reference.

The first deep learning engine may output the first output by integrating the per-passenger joint part image and a per-passenger whole image.

Based on a Recurrent Neural Network (RNN), the second deep learning engine may output an index indicating the emotional state of the inputted voice as the second output.

The third engine may include a deep learning engine configured to output a third output indicating a presence or non-presence of the emergency requiring the emergency measure by giving a weight to each of the first output and the second output and adjust the weight according to feedback information based on the feedback information received from the emergency measure server by the communication unit.

On the other hand, the third engine may include a probability-based model (e.g., Bayesian Network, Hidden Markov Model (HMM), Conditional Random Fields (CRFs), etc.) making a determination based on a probability by receiving the first output and the second output as inputs.

The emergency measure server may include at least one of a police server, a fire station server, or a device server of a registered guardian.

The multi-sensor module may additionally include a GPS sensor and the signal for the emergency measure may include identification information of the mobility device and GPS information of the mobility device.

In addition, the multi-sensor module may additionally include a vibration sensor and information of the vibration sensor may be utilized for the determination.

Accordingly, the present disclosure provides various effects and/or advantages.

According to embodiments of the present disclosure, video and audio signals and the like are analyzed using deep learning engines, a violent situation is automatically determined based on the analysis, and services such as automatic report, video storage, alarm sound generation, and the like may be efficiently performed to ensure safety of a passenger.

Effects obtainable from the present disclosure may be non-limited by the above-mentioned effect. Also, other unmentioned effects can be clearly understood from the following description by those having ordinary skill in the technical field to which the present disclosure pertains. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. The above and other aspects, features, and advantages of the present disclosure will become more apparent upon consideration of the following description of preferred embodiments, taken in conjunction with the accompanying drawing figures. In the drawings.

DETAILED DESCRIPTION

Hereinafter, embodiments of the present disclosure will be described in detail with reference to the accompanying drawings so that those skilled in the art to which the present disclosure pertains may easily implement the present disclosure. However, the present disclosure may be implemented in various different forms and is not limited to the embodiments described herein. In addition, in order to clearly describe this disclosure in drawings, parts unrelated to the description are omitted and similar reference numbers are given to similar parts throughout the specification.

Throughout the specification, when a part "includes" a certain component, this means that it may further include other components, rather than excluding other components, unless otherwise stated.

In addition, a 'mobility device' used in the following description assumes, but is not limited to, a vehicle used for transporting passengers, and may cover Urban Air Mobility (UAM), subway, etc.

Figure 1:
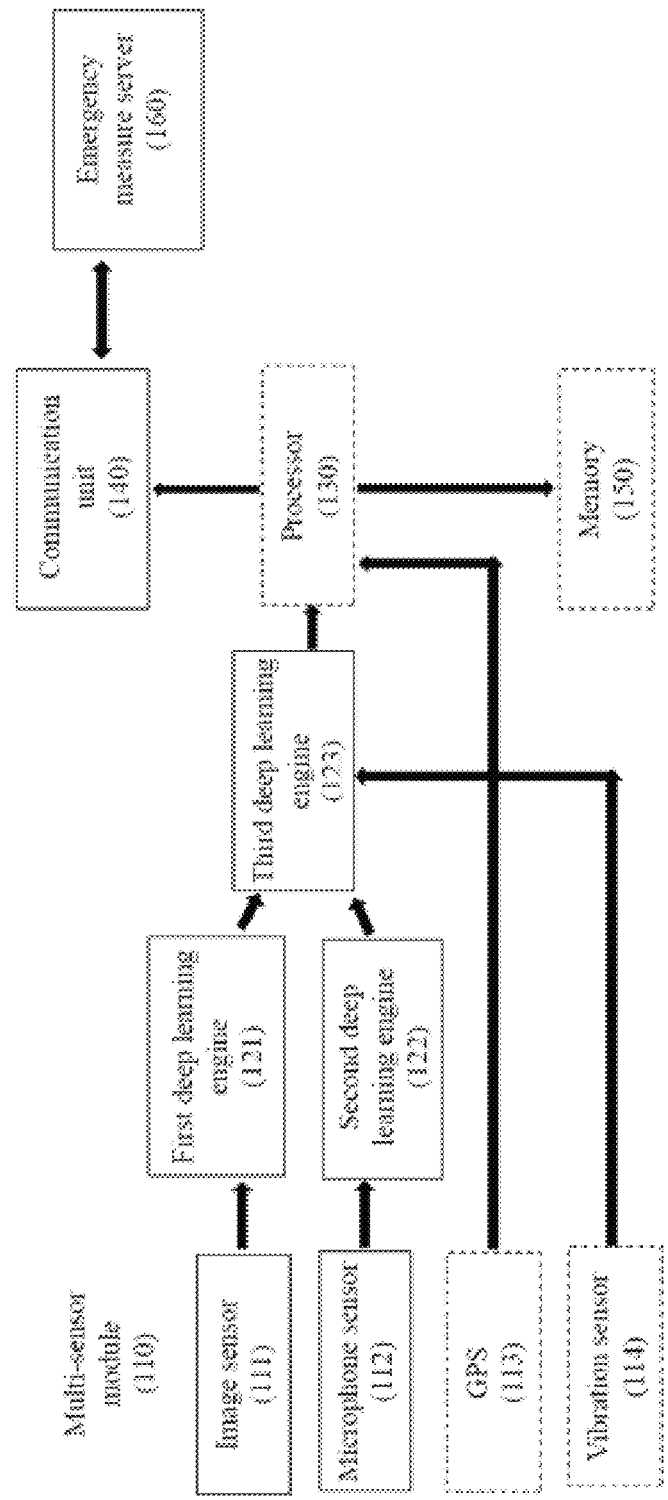
FIG. 1 is a diagram illustrating the concept of a system for automatically managing an emergency in a multi-sensor based mobility device according to one embodiment of the present disclosure.

FIG. 1 is a diagram illustrating the concept of a system for automatically managing an emergency in a multi-sensor based mobility device according to one embodiment of the present disclosure.

First, as shown in FIG. 1, a multi-sensor module 110 may include an image sensor 111 (e.g., a camera) and a sound sensor 112 (e.g., a microphone) installed in a mobility device. The image sensor 111 may be provided to photograph an image of a passenger in the mobility device, and in particular, may be preferably provided to secure joint movements and the like of a driver and a passenger around the driver in which an emergency may occur. In addition, one or more microphone sensors 112 are also provided, and may preferably acquire sound around the driver more precisely.

Meanwhile, an image acquired by the image sensor 111 may be inputted to a first deep learning engine 121. The first deep learning engine 121 may include a deep learning engine that uses a Convolutional Neural Network (CNN) or an improved scheme of the CNN for an image analysis as described below. The first deep learning engine 121 may distinguish passengers from each other based on the inputted image, track joint positions for each passenger, and output a first output indicating whether there is a violent situation.

In addition, as shown in FIG. 1, an audio obtained by the sound sensor 112 may be provided as an input to a second deep learning engine 122. The second deep learning engine 122 may include a deep learning engine that uses a Recursive Neural Network (RNN) or an improved scheme of the RNN suitable for analyzing audio information. The second deep learning engine 122 may be configured to output a second output indicating emotional states of one or more passengers.

As described above, the first output of the first deep learning engine 121 and the second output of the second deep learning engine 122 may be provided as inputs of a third deep learning engine 123. The third deep learning engine 123 may give weights to the first output and the second output, respectively, to provide a third output indicating whether an emergency requiring an emergency measure has occurred as an output. In the example of FIG. 1, the third deep learning engine 123 is described as an example that uses a deep learning method, by which the present disclosure is non-limited. That is, as another example, the third deep learning engine 123 may use various probability-based models (e.g., Bayesian Network, Hidden Markov Model (HMM), Conditional Random Fields (CRFs), etc.) as probability-based engines. Yet, hereinafter, for convenience of the following description, the third deep learning engine 123 will be assumed as an engine that uses deep learning. If the third output corresponds to an emergency requiring an emergency measure, a processor 130 receiving the third output may control the image of the image sensor 111 and the audio of the sound sensor 112 to be stored in a data storage (e.g., memory 150). Yet, the processor 130 may be configured to exist separately or may be functionally merged with the third deep learning engine 123.

The processor 130 or the third deep learning engine 123 having the function of the processor 130 may control a communication unit 140 to transmit the third output to an emergency measure server 160 as a signal indicative of an emergency requiring an emergency measure when the third output corresponds to an emergency that requires an emergency measure. At this time, the communication unit 140 may include a wireless communication unit capable of Vehicle-to-Vehicle (V2V) communication, Vehicle-to-Infrastructure (V2I) communication, etc.

In some implementations, as shown in FIG. 1, the emergency measure server 160 may include a police server, but is not limited thereto, and may include a device of an institution/person capable of coping with an emergency, such as a fire station server, a device server of a guardian registered in the present system, etc.

In addition, as shown in FIG. 1, the system according to the present embodiment may additionally include a GPS sensor 113 and/or a vibration sensor 114 as a multi-sensor module 110.

If the processor 130 or the third deep learning engine 123 having the function of the processor 130 transmits a signal for an emergency measure to the emergency measure server 160 through the communication unit 140, it is efficient for the corresponding signal to include identification information (e.g., a vehicle license plate, etc.) and location information (e.g., GPS information) of the mobility device.

In addition, vibration of a driver's seat or a specific position, which is recognized through the vibration sensor 114, may be used as an auxiliary in determining an emergency by the third deep learning engine 123 or the processor 130.

Figure 2:
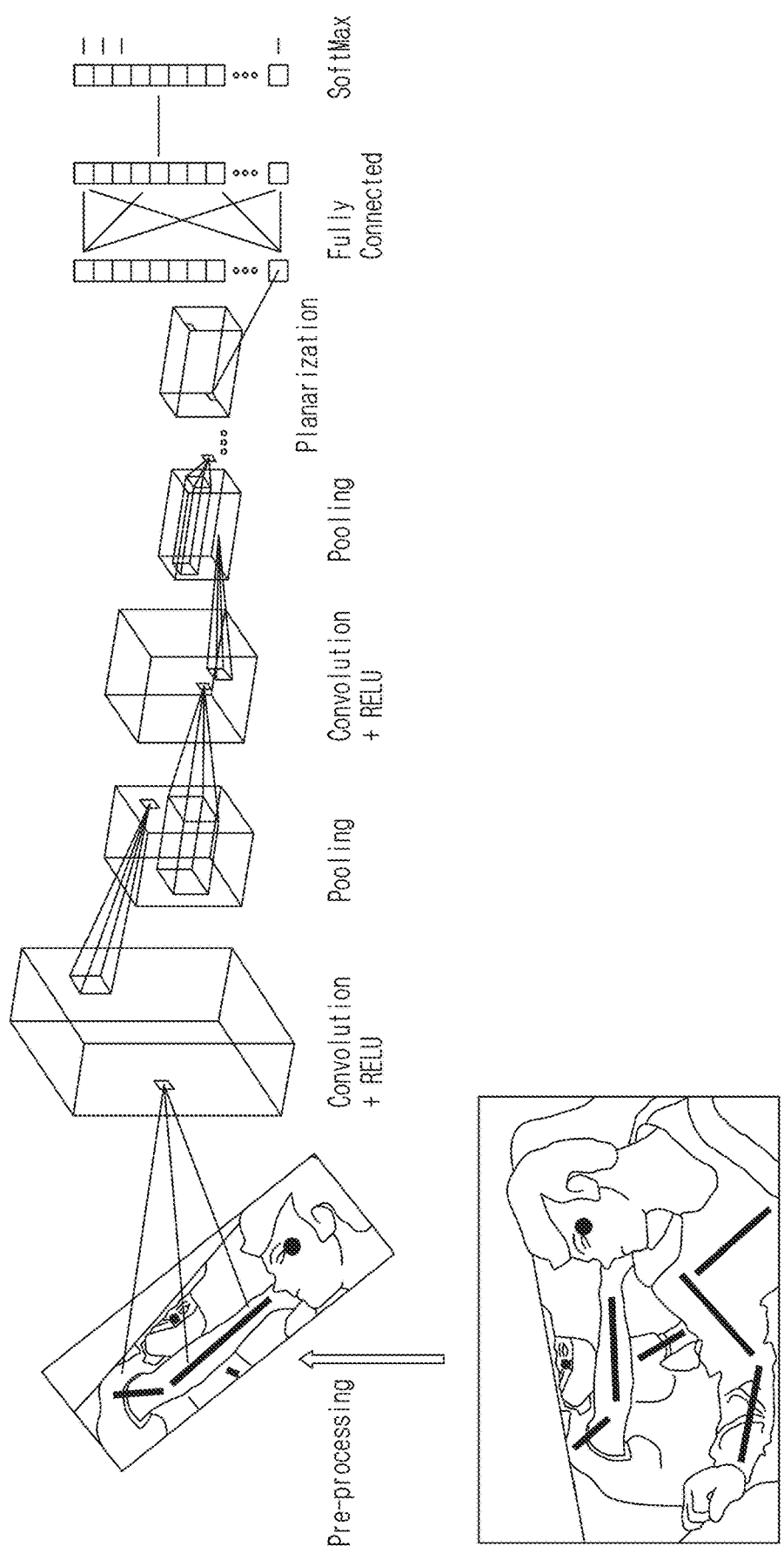
FIG. 2 is a diagram illustrating an operation method of a first deep learning engine according to one embodiment of the present disclosure.

FIG. 2 is a diagram illustrating an operation method of a first deep learning engine according to one embodiment of the present disclosure;

As described above, the first deep learning engine 121 is configured to analyze an image inputted from the image sensor 111 based on deep learning, and may include a CNN engine for image determination or an engine of R-CNN, Fast R-CNN, or Single Shot multi-box Detector (SSD) type, which is an improved scheme of CNN.

FIG. 2 shows an example of using the most basic CNN or R-CNN method. As shown in the lower end of FIG. 2, an image inputted from the image sensor 111 focuses on an image of a joint portion of a passenger in the image as a main determination reference. For example, in determining whether a passenger on a bus assaults a driver, a curved position of a passenger's arm joint, a driver's body position and the like may be used as main feature parts to determine a presence or non-presence of assault.

In order to efficiently determine an image of such a feature part, in the embodiment shown in FIG. 2, a pre-processing process is performed to extract an image of a passenger's joint, and more particularly, a curved shape of a passenger's joint and a position region image of a driver's body/face and use it as CNN-type input data. That is, an image portion including the feature part may be extracted and adjusted to a size that may be compared with a comparison target image.

Since the present embodiment focuses on a passenger's joint image, degradation of performance of determining an emergency may be reduced even if the quality of the image is slightly lowered.

Specifically, as shown in FIG. 2, the feature part image through the preprocessing process may be inputted as input data of a CNN. The CNN according to the present embodiment may include a plurality of convolution layers extracting a feature map in an image of input data and a pooling layer performing subsampling among a plurality of the convolution layers. As shown in FIG. 2, it is preferable that the convolution layers activate only a positive value in the corresponding feature map through a rectified linear unit (ReLU) layer, by which the present disclosure is non-limited.

As described above, the extracted feature vectors may undergo a process of planarizing a three-dimensional image, a feature vector may be outputted through a fully connected layer, and such a feature vector may be classified using Softmax.

Thus, a feature vector of a passenger image classified using Softmax may be compared with an image of a passenger corresponding to a pre-learned violent situation and the like stored in a server and used for emergency determination.

Such a determination result may be outputted as a first output of the first deep learning engine 121 as an index indicating a presence or non-presence of a violent situation.

Although FIG. 2 illustrates an example of making a determination by extracting one feature part image from one image, a plurality of feature part images may be extracted from one image.

Figure 3:
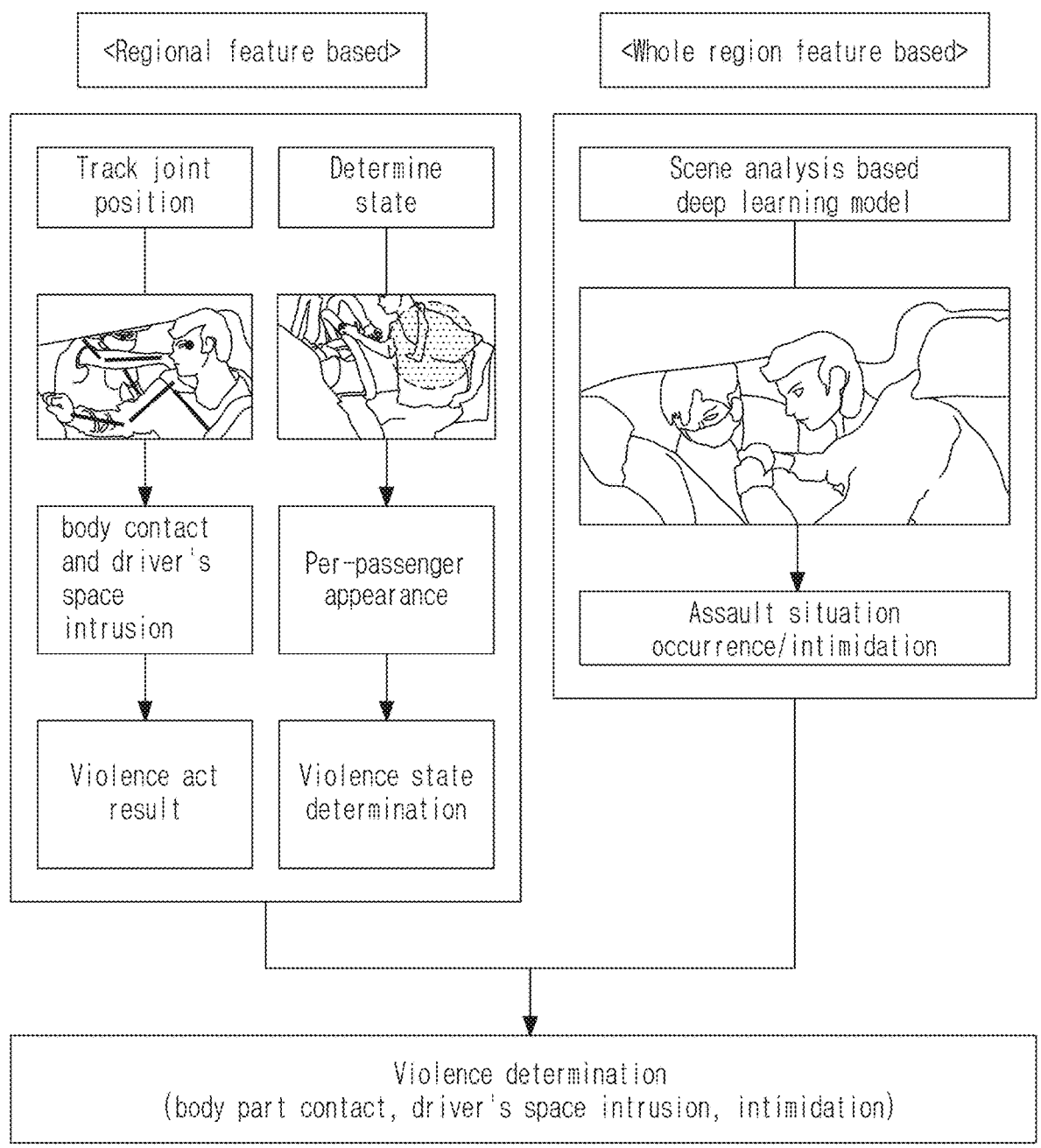
FIG. 3 is a diagram illustrating an operation method of a first deep learning engine according to another embodiment of the present disclosure.

FIG. 3 is a diagram illustrating an operation method of a first deep learning engine according to another embodiment of the present disclosure.

In the above-described embodiment with respect to FIG. 2, the description is made on the assumption of a case that the first deep learning engine 121 performs preprocessing on an image including a feature part of an image obtained from the image sensor 111 and uses only the corresponding feature part image as input data, by which the present disclosure is non-limited. Alternatively, the first deep learning engine 121 may make a determination through a whole input image and a determination per feature part image like FIG. 2 at the same time.

Specifically, the left side of FIG. 3 shows a model for determining a violent situation based on a regional feature, and a per-passenger state may be determined with a whole image as soon as such a process of FIG. 2 as per-passenger joint position tracking is performed. For example, considering per-passenger appearance property, it may be able to determine a violent situation through passenger's dress, a presence or absence of injury, and an injury level.

In addition, a method of determining a violent situation with a whole image is illustrated on the right side of FIG. 3.

The above determining methods may be used separately or in combination. Specifically, when the methods are combined, a final determination may be made by multiplying an output vector of the determination according to each method by a weight determined by the deep learning method.

Figure 4A:
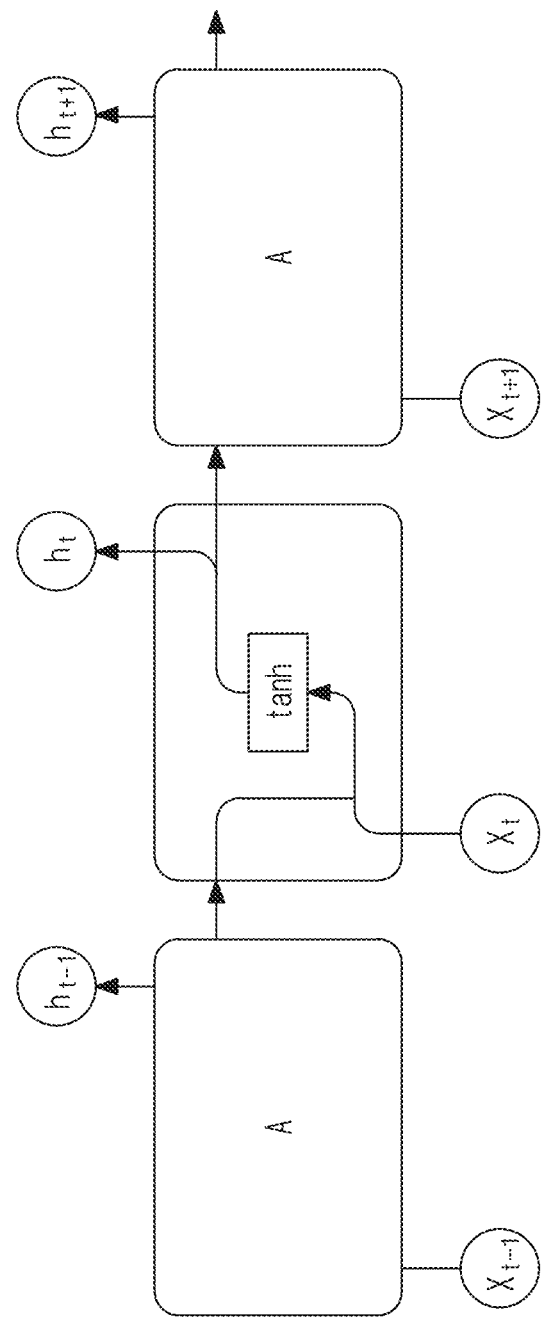
FIGS. 4A and 4B are diagrams illustrating an operation method of a second deep learning engine according to one embodiment of the present disclosure.
Figure 4B:
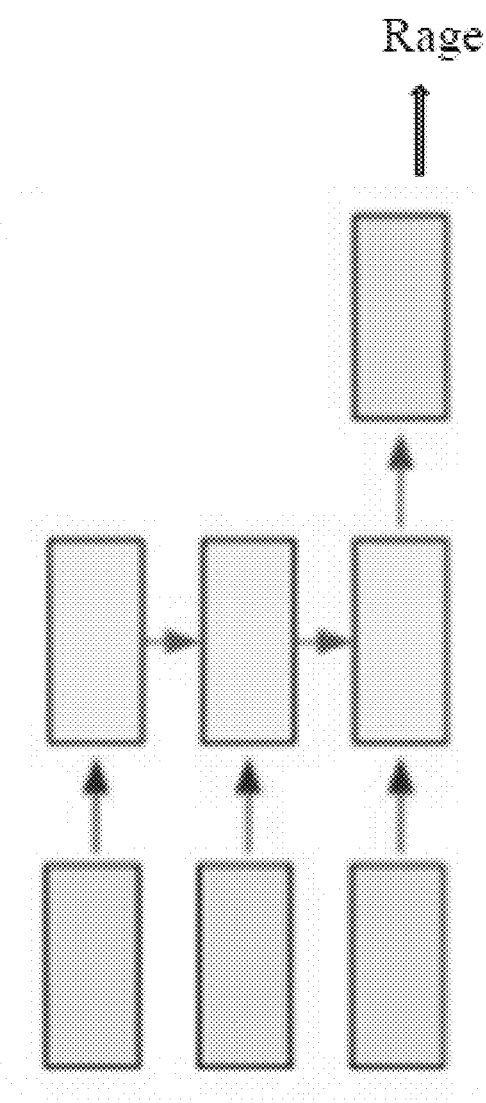

FIGS. 4(A) and 4(B) are diagrams illustrating an operation method of a second deep learning engine according to one embodiment of the present disclosure;

As described above, the second deep learning engine 122 is configured to receive audio information inputted from the sound sensor 112 and provide a result of determining emotional states of one or more passengers as an output. In order to analyze such audio information, an RNN or an RNN-based improvement model (e.g., LSTM, GRU, etc.) having a structure as shown in FIG. 4A may be used.

The RNN method is a method in which information Xt-1 at a specific time point is designed to sequentially affect subsequent information Xt in consideration of the sequential connection relationship of input information, and may be configured to input a value using a nonlinear function such as tanh to subsequent information.

As applications of the RNN, there are a method of providing a plurality of outputs using a plurality of pieces of sequential input information such as audio and the like and a method of providing a single output value using a plurality of pieces of sequential input information (e.g., emotion determination through audio). In the present embodiment, as shown in FIG. 4B, assumed is an example of outputting a value/vector (e.g., rage) indicating an emotional state as a second output signal that is a single output value.

Referring back to FIG. 1, the output values of the first deep learning engine 121 (CNN-based engine) and the second deep learning engine 122 (RNN-based engine) as described above are provided as inputs to the third deep learning engine 123. The third deep learning engine 123 may multiply each of the first output and the second output by a weight to determine a presence or non-presence of an emergency that requires an overall emergency measure, and may provide a third output indicating it as an output.

In this case, the used weight may be learned based on information fed back from the emergency measure server 160 through the communication unit 140. For example, although the third output of the third deep learning engine 122 is recognized as a situation requiring an emergency measure, when there is an error as a result of checking, such feedback information may be used for the determination of the subsequent third deep learning engine 122 and may be applied by changing a weight used specifically.

Figure 5:
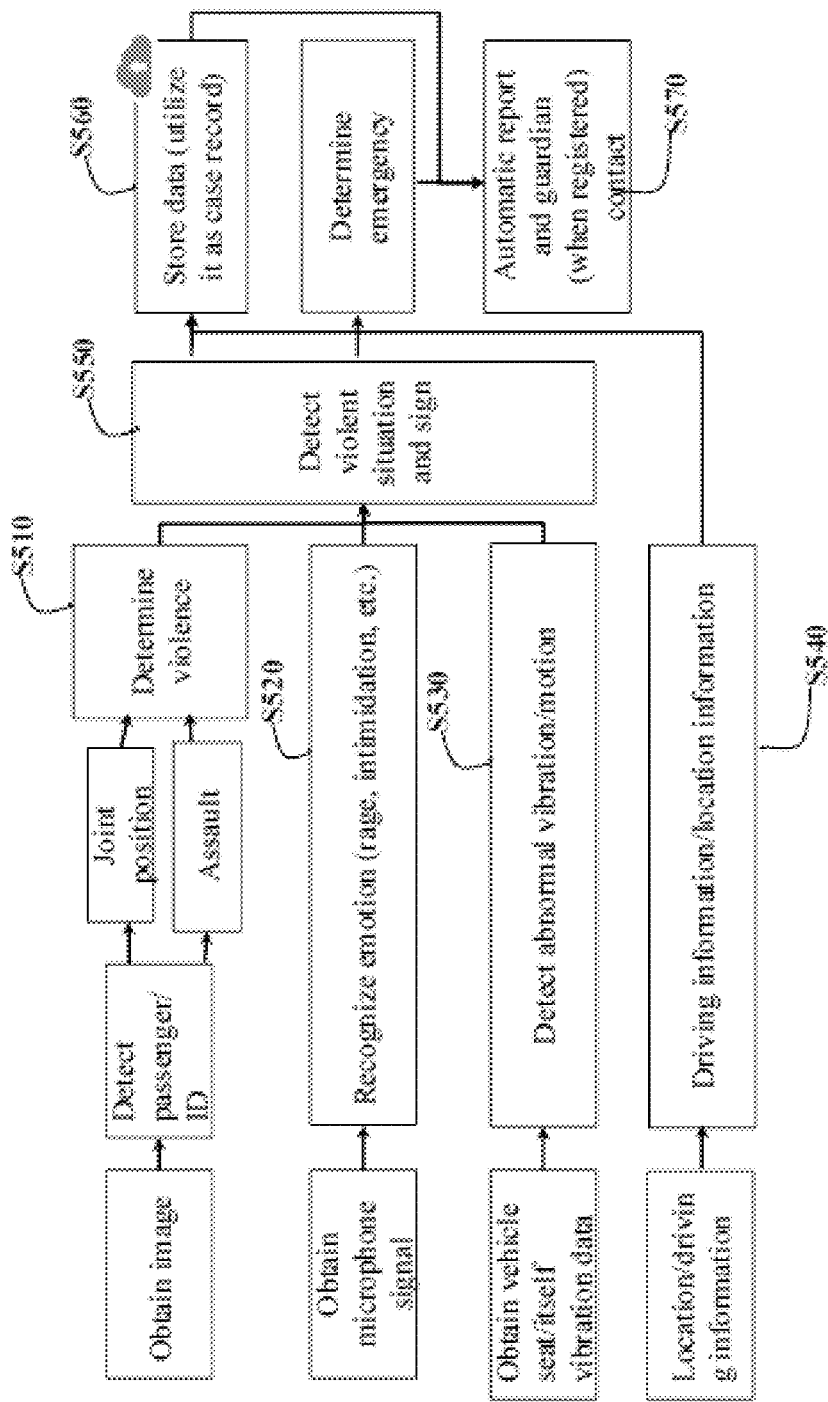
FIG. 5 is a diagram illustrating a method of automatically managing an emergency in a multi-sensor based mobility device according to one embodiment of the present disclosure.

FIG. 5 is a diagram illustrating a method of automatically managing an emergency in a multi-sensor based mobility device according to one embodiment of the present disclosure.

As shown in FIG. 5, an image is acquired by an image sensor, passengers are detected based on the corresponding image, an ID is assigned to each of the passengers, and the ID may be continuously maintained.

Based on this, in the process of monitoring the image, an operation of adding a viewpoint position for each passenger may be performed, and whether or not a beating is performed at a specific time point may be determined using a deep learning model.

For example, the present system may determine that a violent situation is occurring based on a contact of a body part, a driver's space intrusion, a threatening behavior, and the like [S510].

Meanwhile, emotional states of one or more passengers may be determined through the voice acquired by the sound sensor [S520]. For example, using the RNN-based deep learning engine, as described above, a current emotional state of a passenger or passengers may be determined as a rage state, and may be determined as a threatening emotion.

In addition, it may be determined whether an emergency is occurring based on vibration data of vehicle seat/itself [S530].

By integrating these pieces of information, a violent situation and a sign of the violent situation may be determined [S550].

If it is determined that an emergency has occurred, data of the image of the image sensor, data of the voice of the sound sensor and the like as described above may be stored [S560]. This may be used as a record of the corresponding case in the future.

In addition, under an emergency, a signal for an emergency measure may be transmitted to the emergency measure server [S570]. As described above, as an emergency measure, an automatic report may be sent to the police or the like, or the emergency measure may be performed in a manner of contacting a guardian.

Such a signal of an emergency report or the like may be configured to additionally include driving information/location information such as location information and navigation information by obtaining such information [S540].

Figure 6:
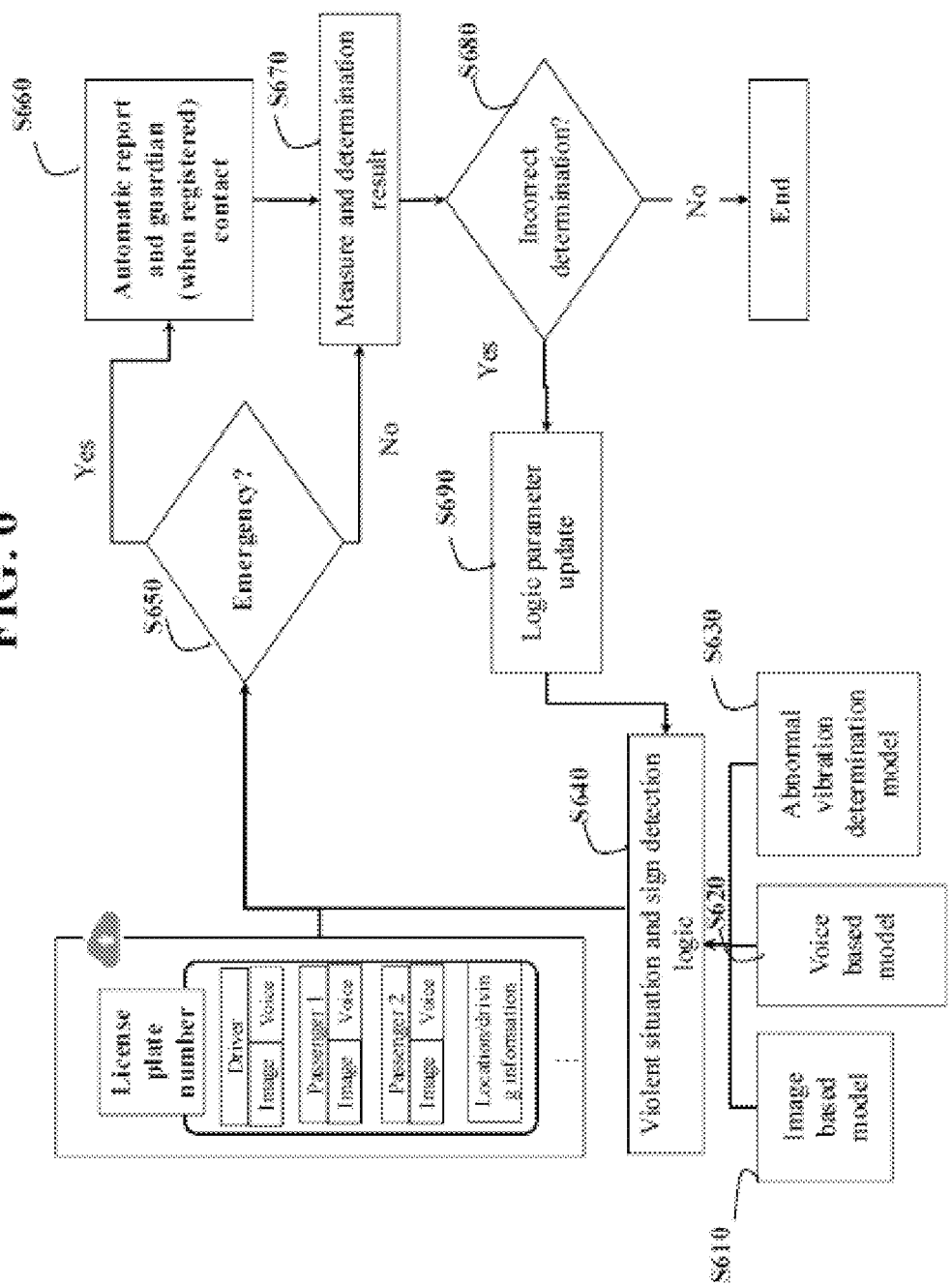
FIG. 6 is a diagram illustrating a process for learning a deep learning algorithm according to one embodiment of the present invention.

FIG. 6 is a diagram illustrating a process for learning a deep learning algorithm according to one embodiment of the present invention.

First, in the embodiment shown in FIG. 6, like the above-described embodiments, a violent situation may be determined based on an image [S610], an emotional state may be determined based on a voice [S620], and whether abnormal vibration is generated may be determined supplementarily/selectively [S630]. Based on such information, a violent situation or a precursor situation (i.e., sign) of such a situation may be detected [S640].

As shown in FIG. 6, as the information used for such determinations, a vehicle license plate number, a combination of image and voice for a driver, a combination of image and voice for a passenger 1, a combination of image and voice for a passenger 2, location/driving information of a vehicle, and the like may be utilized.

If it is determined as an emergency [S650], as described above, a police/guardian may be automatically contacted, and vehicle information, vehicle location information, and the like may be provided [S660].

If it is not determined as an emergency [S650], no special measure is taken, and the monitoring of the above-described process may be continued.

In the embodiment shown in FIG. 6, a process of determining whether the determination result is an incorrect determination is performed [S680]. The incorrect determination may include not only a case in which the system according to the present embodiment operates as an emergency but also a case in which an appropriate measure is not taken due to determining no emergency despite actual emergency occurrence.

When there is such an incorrect determination, the system according to the present embodiment performs a process S690 of updating logic parameters, and thus the determination logic may be learned in the processes of the steps S610 to S640.

A detailed description of preferred embodiments of the present disclosure disclosed as described above is provided so that those skilled in the art can implement and embody the present disclosure. Although the description is made with reference to the preferred embodiments of the present disclosure, it will be appreciated by those skilled in the art that various modifications and variations can be made in the present disclosure without departing from the spirit or scope of the disclosures. For example, those skilled in the art may use the respective components described in the above-described embodiments in a manner of combining them with each other.

Therefore, the present disclosure is not intended to be limited to the embodiments shown herein, but to give the broadest scope that matches the principles and novel features disclosed herein.

A method and system for automatically managing an emergency in a multi-sensor based mobility device according to embodiments of the present disclosure described above may be used not only for public transportation used by a plurality of passengers but also for preventing a passenger from performing threats such as damage to property and the like in a transport means used by autonomous driving.

What is claimed is:

1. A system for managing a situation in a vehicle, the system comprising:
   a multi-sensor module including an image sensor and a sound sensor disposed inside the vehicle;
   a first deep learning model trained to receive an image of one or more passengers in the vehicle obtained by the image sensor and output a first output based on distinguishing among passengers and passenger joint position and determining whether a passenger in the image is engaged in an act of violence as defined by training of the first deep learning model;
   a second deep learning model trained to associate one of a number of specified, predefined emotional states with voice input, the second deep learning model to receive a recording of a voice of the one or more passengers obtained by the sound sensor and output a second output associating one of the number of specified emotional states with the one or more passengers;
   a processor to receive the first output from the first deep learning model based on the image of the one or more passengers in the vehicle and to receive the second output from the second deep learning model specifying one of the number of predefined emotional states based on the voice input, the processor further to separately assign a different weight to each of the first and second outputs to produce a third output and, based on the third output, determine whether to take an action to promote safety in the vehicle and to take the action when indicated, the action to promote safety comprising at least one of storing a recording from either of the image sensor and sound sensor and transmitting an emergency signal to an emergency measure server;
   wherein the processor is configured to adjust weights assigned to the first and second outputs based on feedback received from the emergency measure server.

2. The system of claim 1, further comprising the processor being configured to store the recording from either of the image sensor and sound sensor in response to the determination to take an action to promote safety in the vehicle.

3. The system of claim 1, wherein, based on the third output, the processor is configured to store an emergency time, a location of the vehicle, or a driving status of the vehicle.

4. The system of claim 1, wherein the first deep learning model is configured to output, based on a convolutional neural network (CNN), the first output including an index indicating the presence or non-presence of a violent situation in the vehicle.

5. The system of claim 4, wherein, for outputting the first output, the first deep learning model is configured to integrate the per-passenger joint part image and a per-passenger whole image.

6. The system of claim 1, wherein the second deep learning model is configured to output, based on a recurrent neural network (RNN), the second output associating one of the number of specified emotional states with the one or more passengers.

7. The system of claim 1, wherein the processor comprises a probability-based model configured to make a probability-based determination based on the first and second outputs.

8. The system of claim 1, wherein the emergency measure server comprises a police server, a fire station server, or a device server of a registered guardian.

9. The system of claim 1, wherein:
   the multi-sensor module further comprises a GPS sensor, and
   the emergency signal transmitted includes identification or location information of the vehicle.

10. The system of claim 1, wherein:
    the multi-sensor module further comprises a vibration sensor, and
    the processor is further configured to determine whether to take the action based on abnormal vibration information detected by the vibration sensor.

11. A method for managing a situation in a vehicle comprising a multi-sensor module including an image sensor and a sound sensor disposed inside the vehicle, the method comprising:
    receiving an image of one or more passengers in the vehicle obtained by the image sensor, the image being input to a first deep learning model trained to output a first output based on using an image to distinguishing among passengers and passenger joint position to determine whether a passenger in the image is engaged in an act of violence as defined by training of the first deep learning model;

receiving a recording of a voice of the one or more passengers obtained by the sound sensor, the recording being input to a second deep learning model trained to associate one of a number of specified emotional states with voice input, the second deep learning model outputting a second output associating one of the number of specified emotional states with the one or more passengers; and after receiving the first output from the first deep learning model based on the image of the one or more passengers in the vehicle and to receive the second output from the second deep learning model specifying one of the number of predefined emotional states based on the voice input, separately assigning a different weight to each of the first and second outputs, with a processor, to produce a third output and, based on the third output, determine whether to take an action to promote safety in the vehicle and to take the action when indicated, the action to promote safety comprising at least one of storing a recording from either of the image sensor and sound sensor and transmitting an emergency signal to an emergency measure server;

wherein the processor is configured to adjust weights assigned to the first and second outputs based on feedback received from the emergency measure server.

12. The method of claim 11, further comprising, with the processor, storing the image or recording from either of the image sensor and sound sensor in response to the determination to take an action to promote safety in the vehicle.

13. The method of claim 11, wherein, based on the third output, the processor is configured to store an emergency time, a location of the vehicle, or a driving status of the vehicle.

14. The method of claim 11, wherein the first deep learning model is configured to output, based on a convolutional neural network (CNN), the first output including an index indicating the presence or non-presence of a violent situation in the vehicle.

15. The method of claim 11, further comprising, outputting the first output with the first deep learning model after integrating a per-passenger joint part image and a per-passenger whole image.

16. The method of claim 11, wherein the second deep learning model is configured to output, based on a recurrent neural network (RNN), the second output associating one of the number of specified emotional states with the one or more passengers.

17. The method of claim 11, wherein the processor comprises a probability-based model configured to make a probability-based determination based on the first and second outputs.

18. The method of claim 11, wherein the emergency measure server comprises a police server, a fire station server, or a device server of a registered guardian.

19. The method of claim 11, wherein:
the multi-sensor module further comprises a GPS sensor, and
the emergency signal transmitted includes identification or location information of the vehicle.

20. The method of claim 11, wherein:
the multi-sensor module further comprises a vibration sensor, and
the processor is further configured to determine whether to take the action based on abnormal vibration information detected by the vibration sensor.

* * * * *